United States Patent [19]

Falkenhainer et al.

[11] Patent Number: 5,930,801

[45] Date of Patent: Jul. 27, 1999

[54] SHARED-DATA ENVIRONMENT IN WHICH EACH FILE HAS INDEPENDENT SECURITY PROPERTIES

[75] Inventors: Brian C. Falkenhainer, Pittsford; Mitchell Garnaat, Fairport, both of N.Y.

[73] Assignee: Xerox Corporation, Stamford, Conn.

[21] Appl. No.: 08/961,002

[22] Filed: Oct. 30, 1997

Related U.S. Application Data

[60] Provisional application No. 60/040,114, Mar. 7, 1997, and provisional application No. 60/051,000, Jun. 27, 1997.

[51] Int. Cl.$^6$ ..................................................... G06F 17/00
[52] U.S. Cl. ................................. 707/103; 707/2; 707/10
[58] Field of Search ................................. 707/1, 6, 8, 10, 707/2, 102, 103; 395/200.59, 187.01, 680, 200.49

[56] References Cited

U.S. PATENT DOCUMENTS

| | | | |
|---|---|---|---|
| 5,132,900 | 7/1992 | Gilchrist et al. | 364/419 |
| 5,162,992 | 11/1992 | Williams | 364/419 |
| 5,179,718 | 1/1993 | MacPhail | 395/800 |
| 5,388,196 | 2/1995 | Pajak et al. | 395/153 |
| 5,418,946 | 5/1995 | Mori | 395/600 |
| 5,423,034 | 6/1995 | Cohen-Levy et al. | 395/600 |
| 5,560,008 | 9/1996 | Johnson et al. | 395/680 |
| 5,568,640 | 10/1996 | Nishiyama et al. | 395/600 |
| 5,649,099 | 7/1997 | Theimer et al. | 395/187.01 |
| 5,708,709 | 1/1998 | Rose | 380/4 |
| 5,708,780 | 1/1998 | Levergood et al. | 395/200.59 |
| 5,727,156 | 3/1998 | Herr-Hoyman et al. | 395/200.49 |
| 5,745,750 | 4/1998 | Pocaro | 707/1 |
| 5,778,367 | 7/1998 | Wesinger, Jr. et al. | 707/10 |
| 5,794,230 | 8/1998 | Horadan et al. | 707/2 |

FOREIGN PATENT DOCUMENTS

| | | |
|---|---|---|
| 0 398 645 A2 | 11/1990 | European Pat. Off. . |
| 0 458 718 A2 | 11/1991 | European Pat. Off. . |
| 04336345 | 11/1992 | Japan . |
| 2 295 909 | 12/1996 | United Kingdom . |
| WO 97/15008 | 4/1997 | WIPO . |

OTHER PUBLICATIONS

The article "Document Management Software: Overview," (Datapro Information Services Group, Apr. 1997).

"Basis Document Manager," from Information Dimensions, Inc., is a document management application platform.

"AltaVista Forum: Focus on OnSite Conference." A description of OpenText is given in a press release of Feb. 28, 1997, entitled Juggling Deeds, Deadlines: Document Workflow Solutions.

"Intranets Are the Next Way to Manage Documents," *Imaging Magazine*, May 1997, pp. 26–39.

"Information Management Challenges and Opportunities on the Internet," (Datapro Information Services Group, Feb. 1997).

*Primary Examiner*—Wayne Amsbury
*Assistant Examiner*—Thuy Pardo
*Attorney, Agent, or Firm*—R. Hutter

[57] ABSTRACT

A shared-data system, such as could be used with an intranet or internet, in which a large quantity of files available in a file system are each individually assigned an identification number. This identification number is then converted into a non-location-based URL, such as a simple scalar number, which can be retained in a user's network browser. Further, each file has associated therewith an individual data object, by which an owner of a particular file can specify read and write access to the file. The system enables new users to create their own accounts to access the file system, without causing a general security breach. The use of location-independent URLs to identify files enables individual users to organize the files independently, and also avoids "stale" web links which occur when websites are reorganized.

7 Claims, 3 Drawing Sheets

FIG. 1

Title: AIR User
Owner: falkenhainer
Private: ○ Yes ● No
Access List:

| User/Group | Reader | Writer | Manager | Remove From Access List |
|---|---|---|---|---|
| Brian Falkenhainer | x | x | x | |
| John Doe | ☑ | ☑ | ☑ | ☐ |
| Anyone | ☑ | ☑ | ☐ | ☐ |

[ Reset ]  [ Update Permissions ]

SHARED-DATA ENVIRONMENT IN WHICH EACH FILE HAS INDEPENDENT SECURITY PROPERTIES

CLAIM OF PRIORITY TO PROVISIONAL PATENT APPLICATIONS

The present application claims priority, for different parts of the disclosure thereof, from U.S. Provisional Patent Application No. 60/040,114 filed Mar. 7, 1997, and U.S. Provisional Patent Application No. 60/051,000 filed Jun. 27, 1997.

FIELD OF THE INVENTION

The present invention relates to a software environment in which a plurality of users can create and share sets of documents or files.

BACKGROUND OF THE INVENTION

In work environments in which a large number of users exchange data, in the form of documents, files, or other entities, among themselves, there is a need to provide shared resources in which any one of the number of users can access a particular document which is in a "public space" available to all. Similarly, there is a need for a mechanism by which a user who has created a document or file can place his work in this public space to be viewed by others, and if desirable edited by others. At the same time, it is desirable, in a shared-files system, to have some mechanism for security with respect to publicly-available documents, so that there can be some order and control over the contents of documents.

In the prior art there are known various techniques for facilitating such a shared-file or share-document environment. One type of multi-user software, an example of which is Xerox® GlobalView® software, provides a concept of "shared file drawers." A shared file drawer is an icon which is present on the screens of a set of users, and the contents of this drawer can be altered by anyone with access to the drawer (although certain documents may be locked as "read-only" documents). However, with GlobalView®, basic access to the drawer is limited to those users who have been given the icon for the drawer by a system administrator: Further, a person with access to a particular drawer will have at least read-only access to every document in the drawer.

A variant on the "shared drawer" concept is the "shared drive" system, which is familiar from Novell® network drives. Once again, a set of users must be given access to a particular drawer by a system administrator, and for the most part a person with access to the drive has complete access to every file in the drive. Another drawback of the network drive system is that the organization of the drive, from the perspective that each user, is intimately related to the hardware structure of the local area network (LAN).

Another mechanism for enabling the sharing of files or documents relies on an "Internet" or "website" model. In this model, documents can exist via hypertext or other links from a home page. While certain documents linked to a particular website may have security properties associated therewith, such as a necessity for a password, this model once again has the drawback that a "web master" is required to control the entire security apparatus, very much in the manner of a system administrator in the above-described systems. The presence of a web master or system administrator represents a bottleneck in the usability of a system, because very often no new documents can be made available without permission of the web master. Further, a web master must be dedicated on an active, ongoing basis to the management of a website, and hypertext links within the website can become stale, i.e., lead to documents which no longer exist because the web master may not have ownership of particular documents linked to the website.

There thus exists a need for a shared-data environment which overcomes the above practical drawbacks.

SUMMARY OF THE INVENTION

According to the present invention, there is provided a method of managing a plurality of files stored in an electronic file system. A unique identification number is assigned to each file in the file system. A unique identification number is assigned to a user with access to any file in the file system. An object database is provided, the object database including therein an object associated with each file in the file system, the object including the identification number of the file and an identification number of a user having access to the file. A software mechanism is provided whereby each identification number assigned to a file is associated with a location-independent URL. When a user enters a URL of a desired file, the identification number of the desired file is determined, the identification number of the user is determined, and the object associated with the desired file is consulted to determine if the user has access to the file.

DETAILED DESCRIPTION OF THE INVENTION

System overview

In the following discussion, three specific terms will be defined: a "file" is a file of data that may be retrieved for viewing or editing, such as in a word-processing, graphics, or spreadsheet format. An "object" is a smaller piece of metadata which describes certain persistent attributes of a file. A "handle" is simply an identification number by which a file (or other data entity) in a file system is associated with the object which describes it.

Figure 1:
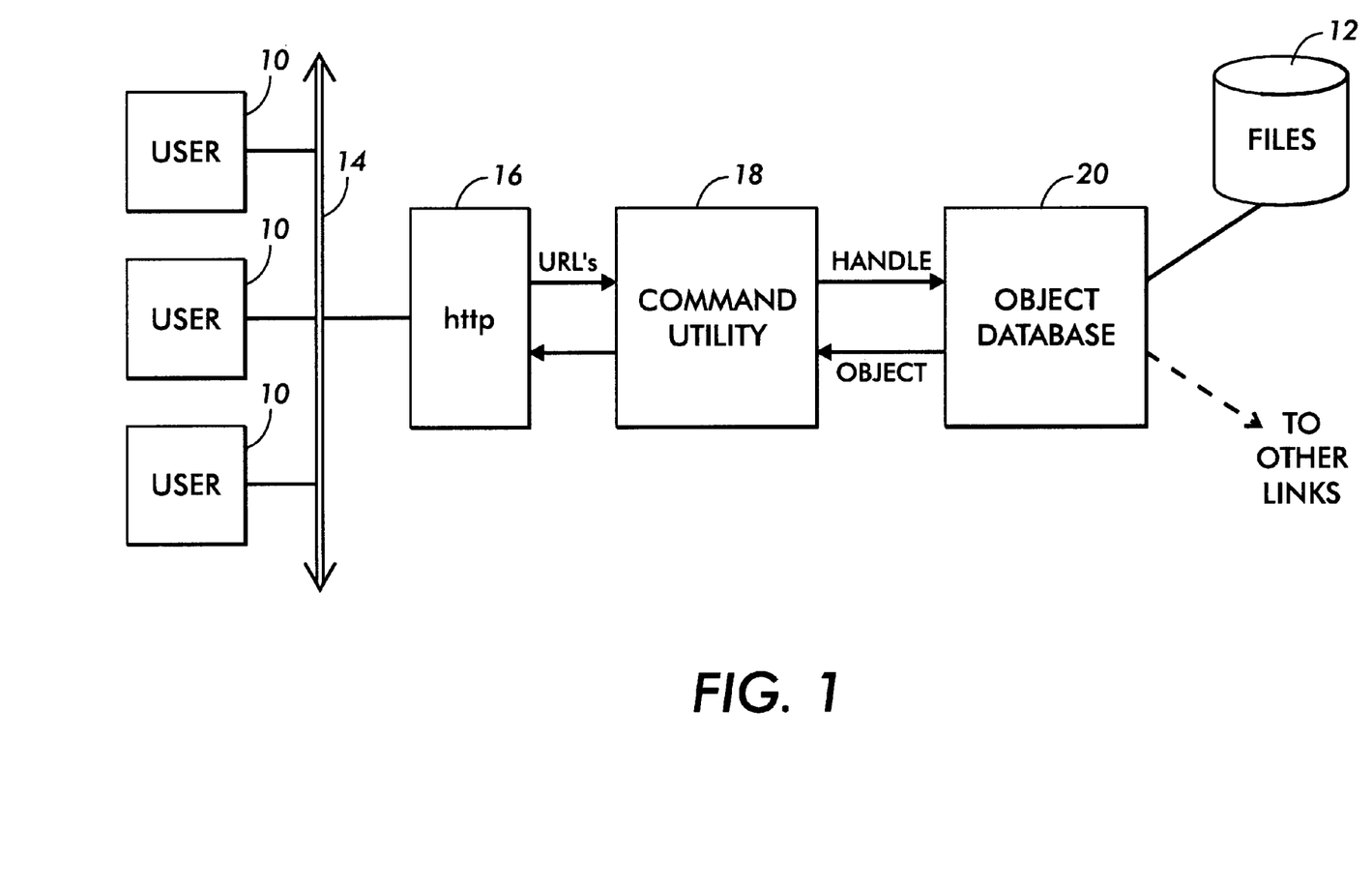
FIG. 1 is a diagram showing the basic functionality of the environment according to the present invention.

FIG. 1 is a simplified diagram showing the basic elements of an embodiment of the environment according to the present invention. One overall purpose of the environment of the present invention is to allow a large number of users, here each indicated as 10, access to various files, such as word-processing or spreadsheet documents, stored in a file system 12, which may be in the form of, for example, a hard-drive or network server.

According to the present invention, individual files within the file system 12 are each associated with what is here called an "object." In the present context, an "object" associated with a file in file system 12 is a set of metadata, or in other words, a field or string of data, which describes the access properties (read and/or write permissions), hierarchical relations, and other properties of the file. According to the present invention, the "object" associated with each file is essentially permanently associated with that file, as long as the file exists in the file system 12, regardless of whether, for example, it is edited or renamed or otherwise altered.

Going through FIG. 1 in detail, a plurality of users 10, each of which has control of, for example, a personal computer, are connected via a network 14, to a server 16. According to a preferred embodiment of the present invention, the server 16 is an http server, accessed over the network 14 by standard internet browsers on the personal computer of each user 10. The users 10 access the server 16 through standard URLs ("universal resource locators"), in a manner familiar in network or internet communication.

The http server 16 communicates with what is here called a "command utility" 18. The command utility 18 is a set of programs or subroutines, each program corresponding to one command which influences an "object" as defined above. These objects, each object being associated with one or more files in the file system 12, are retained in an object database 20. The objects in object database 20 each are linked to an identified file in the file system 12, or alternately could be associated with links (such as over another network) to other sources of files.

When a user 10 wishes to create a file, such as a document, which he desires to be accessible only to a subset of users on network 14, the user submits the document through network 14 and http server 16 to the command utility 18 with a command such as "add file" or "create file." In response to this request from a user 10, the command utility 18 then sends back to the particular user 10 a form which appears on the screen of the user 10, which the user 10 fills out with respect to the file he is submitting to the file system 12.

Among the information required by the command utility 18 (which will be exhaustively described in detail below) are: The name of the user submitting the file (who becomes the "owner" of the file), a list of names of other users whom the owner is permitting read and/or write access to the file; and a list of hierarchical "parents" and "children" of the document (i.e., whether the new file is intended to be part of a larger collection of files, such as a "November" file being placed within a collection "Monthly Reports"). All of this metadata which the user submits in the field becomes part of the "object" which then is placed by command utility 18 in the object database 20. Further, upon submission of this file and the creation of the object by command utility 18, the command utility 18 also creates an unique identification number, which in the present context is called a "handle," and permanently associates this handle with the object and to the file associated with the object. Thus, at the end of the process, the file created by user 10 is stored in file system 12, and the object is stored in database 20. The file and the object are associated with each other by their common handle. The object in database 20 includes all of the data describing the permissions, hierarchy, ownership, etc. of the file identified by the handle.

As will be described in detail below, once a file (or collection or other entity) is created in file system 12 and is assigned a handle, the command utility 18 creates a new URL which specifies the handle which has been assigned to the file. This new handle-based URL in effect supersedes the original network-based URL which the file may have originally had. This new URL is then sent to the browser of the user 10, and in the future the browser (such as a bookmark therein) of the user 10 will refer to the file exclusively by its handle-based URL, and not by its original URL. This feature is important from the perspective of avoiding "stale links" which occur when a URL includes artifacts from its original location.

At a later time, when another user 10 wishes to see the file in file system 12, the user who wishes to read the file requests the file through the http server 16. In general, the file desired to be read is referenced by the user by its common name, e.g., "Sales Report for November," either by typing in the common name, typing in the handle, or clicking on the name of the desired file when it is displayed in a menu or a search engine report. The common name of the desired file is then passed through server 16, through an http or other protocol, and then this request is sent to the command utility 18. The command utility 18 locates the object of the desired file in the object database 20, which in turn locates the corresponding file or files (in the case of a collection of files) in file system 12 for retrieval back to the user. The handle associating the object with the file, according to a preferred embodiment of the present invention, can be made completely invisible to a user on network 14. Further, according to a preferred embodiment of the invention, the handle for a particular file persists even if the file is subsequently renamed: the command utility 18 merely amends the common file name that is associated with that handle, the common title of a file being just one of the several variables defined in the object associated with the file.

Also, significantly, the files which are placed in file system 12 are in no particular order, need be in no particular location in the file system 12, and preferably do not specify any hierarchical relationship to other files. Preferably, all of the interrelations among files in file system 12 are specified only within the objects in database 16. There need be no inherent hierarchy of folders, sub-files, etc., within file system 12.

As will be described in detail below, there may exist numerous distinct types of objects, each object describing a specific type of file retained in file system 12. For example, what is known as a "file" is simply a document, as would appear in a word-processing or spreadsheet format. A "collection" refers to a collection of "files," such as for example the collection "Monthly Reports" including separate files for "January," "February," etc. The object for a collection includes therein, among other metadata, a list of the handles of files or other collections which are "children" of that collection. Thus, the handle for "Monthly Reports" will include a list of the handles of the files associated with each of the Monthly Reports. Significantly, one attribute of the system of the present invention is that the hierarchical relationships among files are retained in the objects associated with the individual files, and are not inherent to a hierarchical structure of the data. For example, one file, such as could be described as "Accounting Report from New York Office for November," can appear in two or more separate collections, such as "Monthly Reports," "Reports from New York Office," and "Reports from Accounting Department." Even though the same file appears in three separate collections, the file itself is retained in only one physical location in the file system 12, and collections of files are assembled on an ad-hoc basis only when requested by a particular user who wants to see a collection.

Other types of objects and associated files that may be created by the environment of the present invention include a calendar, which includes spaces, corresponding to days, in which events may be placed. Events themselves are described by a type of object, and can each correspond to their own file. Thus, should the owner of a file describing an event want to change the description of the event, a revision to the description of the event will appear in the calendars of every user in which the event appears. Once again, although each user may have his or her own calendar, the events within the calendars, being files described by objects, exist independently of the calendar.

Still other types of objects which describe files include "bulletins" and "bulletin boards." Generally, bulletins are short ASCII messages, which are collected in a collection called a "bulletin board," the bulletin board typically being simply a collection with a large number of users with read/write/add bulletin/remove bulletin access. Further, an object may describe a file which is in fact a URL to another network location; one possible advantage of this is to place a useful website within a collection which is relevant to other files in the collection.

Objects and Handles

Having explained the general function of the system of the present invention, attention is now drawn to a detailed implementation of the handles which are generated by the command utility 18, and the objects which are retained in the object database 20. As mentioned above, in general, the files retained in file system 12, each of which is described by an "object" in object database 20, are generally of two types: "files," which are simply quantities of data such as in a word-processing document, and "collections," which are objects which point to a plurality of files.

As an object is placed in object database 20 and file system 12, the command utility 18 generates a unique identification number, or "handle," which is permanently identified with the object and enables the object to be associated with the file or files in the file system 20. For a simple file, that is, a mere collection of data as in a word-processing document, a typical handle would be FILE-2523. What is important, as will be described in detail below, is that the handle is "non-location based," such as the simple scalar number in the example, in that it does not refer to a specific location of the file in, for example, a server. (In the following discussion, random four-digit numbers are used to illustrate different handles, and the random numbers themselves have no meaning beyond identifying a particular object and file.) Within the object database 20, the handle includes a few characters or a number indicating the type of object, in this case a file, and then the actual identification number. Typically, identification numbers for handles are issued in numerical order as new files, collections, etc. are created.

A handle for a collection would look something like COLLECTION-5811 (i.e., a code indicating the following digits refer to a collection, and then the digits), and the object corresponding to this collection would include therein a list of files incorporated in the collection, for example, COLLECTION-5811: {FILE-0871 FILE-7737 FILE-4391}, indicating that those files identified by those particular handles will be "pointed to" when the handle for the collection is requested by a user. Such a collection of handles pointed to by another handle is known as a "handle list." Once again, whereas a file exists in only one location in the file system 12, its handle may appear in the handle of any number of collections in which that file is desired to appear. Only when a user requests to view a particular collection will the files within that collection be "assembled" for display to a user at that particular time. Individual files are not stored in the file system 12 in any hierarchical manner: such hierarchies as "Monthly Reports" are created only an ad-hoc basis when the collection object describing such a hierarchy is invoked by a user.

For collections within collections, such as for example the hierarchy "Sales Reports/Monthly Reports/November," the collection object "Sales Reports" may include handles for a number of collection objects, of which "Monthly Reports" is only one. In turn, the collection "Monthly Reports" includes therein handles to files for each monthly report.

In one embodiment of the present invention, database 16 is a relatively small electronic memory separate from the electronic memory forming file system 12. File system 12 could indeed comprise several electronic memories, which interact with each other through a network. Database 16 could be defined in a distinct area of a larger electronic memory in which file system 12 is comprised.

Below is a table describing the "attributes" or detailed information which may be contained within each object retained in the object database 20. In all cases each attribute is a type of variable, and a collection of these variables strung together forms the complete object.

| NAME | TYPE | DESCRIPTION |
| --- | --- | --- |
| handle | string | The handle of this object |
| title | string | The title or name of the object. |
| summary | string | A short (preferably one-line) description of the object. |
| description | string | A longer description of the object that may be used to hold an abstract for a document or a summary of an experiment. |
| create_date | float | A floating point representation of the time and day the object was created. |
| modified_date | float | A floating point representation of the time and day the object was last modified. |
| modified_by | handle | The handle of an object representing the user who last modified the object. |
| owner | handle | The handle of the object representing the user who created and owns the object. |
| readers | handle-list | A list of handles to user and/or group objects that have been granted read access to this object. |
| writers | handle-list | A list of handles to user and/or group objects that have been granted write access to this object. |
| parents | handle-list | A list of handles to objects considered to be parents of this object. This attribute provides the illusion of a hierarchical structure, but enables objects to appear in multiple locations. |
| children | handle-list | A list of handles to objects considered to be children of this object |
| keywords | handle-list | A list of handles to keyword objects representing keywords that are applicable to this object. |
| links | handle-list | A list of handles to objects which are linked to this object. |

Object Commands

As mentioned above with reference to FIG. 1, the objects which describe various files and collections are acted upon by commands which ultimately originate with users 10 on the network 14. It is a function of the server 16 to convert the plain-language or Internet commands from the users 10 to commands which can be carried out by the command utility 18. Certain commands, such as to add (i.e., create) a file or collection, and to view a file or collection, have been described briefly above, but the following discussion is a series of detailed descriptions of the operations behind commands in a currently-preferred embodiment of the present invention.

View: This is a command when a user wants to view a file, or collection of files, in file system 12. If the requested file or collection is invoked by its title, the command utility 18 can scan the "title" variables in the objects in database 20 to find the object associated with the requested file or collection. In the case of a collection, the command utility generates a screen suitable for viewing by the user, such as a list of the titles (derived from the objects) for each file within the collection. Thus, if a user required "Monthly Reports," in this particular embodiment of the invention, there will ultimately appear on his screen a list of the titles of the Monthly Reports from which he can select; generally, with the simple "view" function, no file is retrieved from the file system 12.

Get: This is similar to the "view" command, but applies only to files, and allows the requesting user to see the file itself, such as in the form of a word-processing, graphics, or spreadsheet document. The command utility 18 locates the object by title, looks at the handle of the object, and then retrieves the file from the file system 12 using the handle. For files, one portion of the object describing the file is the "mime type," indicating the type of document format the file is in. The command utility 18 then causes the retrieval of the file from file system 12, and then sends the file to the user, according to the mime type.

Add: This command is used at the creation or submission of a file to file system 12, or the creation or submission of a new collection of files, which must be identified by a new object. In response to such a command from a user, the command utility 18 creates a prototype of the type of desired object, such as a calendar or empty collection. The command utility then causes a screen to be sent back to the user, the screen being an entry form to be filled out by the user in the case of, for example, a calendar or collection, in which the user inserts into spaces in the form what files he wants to have inserted into the empty prototype. After the form screen is filled out, the user clicks a "submit" button. In response to this "submit" command, the command utility 18 creates an object of the desired handle, using the data submitted by the user when filling out the form on the screen, and then generates a handle (such as from a counter within command utility 18) to assign a unique identification number forming the handle for the object. The new object, with its new handle, is then entered into object database 20. In the case of adding a file, the command utility 18 also sends on to file system 12 the file which is identified only by the handle which has just been generated. Any common original name of the file, such as "November Report," is retained only as a string variable within the object, as an attribute, as in the table above.

View properties and edit properties: This is a command for a user, who is typically the owner of the object in question to view and, if desirable, edit the properties embodied in the object. As will be explained below in regard to "permissions," only the owner is authorized to make changes in the attributes. When a command regarding the properties is submitted by a user to command utility 18, the command utility 18 displays the data within the object in a usable form on the screen of the user. If the user is so authorized, the user can in effect move or copy the object from one collection to another by changing the "parents" or "children" fields, and can also change the list of users who have read and/or write permission in regard to the object and its underlying files. Also, only the owner of an object has the authority to completely delete an object from the object database 20, and in turn delete the underlying files from file system 12.

Version number: In situations where there may exist several versions of what is considered to be the "same" document, such as in the case of edited versions of a word-processing document, or updated versions of a spread sheet, the command utility 18 is capable of generating "revised" handles while maintaining a connection between different versions of what is considered to be the same file. For example, if one draft of a document is given the number FILE-3672, and edited version of the draft which is added to the file system 12 later in time can be given the handle FILE-3672-2. Provisions can be made in the object database 20 to accommodate multiple versions of objects with the same handle. (Alternately, a "version number" can be made a field within an object.) There thus can readily exist commands for retrieving from file system 12 "all versions" of a file or just the "latest version," or the "first version." The command utility 18 can then select from object database 16 the appropriate handle which corresponds to the specific desired version of the file.

Permissions

As mentioned above, a practical limitation of most prior-art shared-data systems is that security with respect to individual documents stored in various collections is "all or nothing." That is, in a shared-drawer or shared-drive system, whereas a system administrator can restrict access to the drawer itself, once a person has access to the drawer or drive, all of the documents therein are accessible to him. If different levels of security for different types of documents are desired, with different subsets of users being allowed access to different subsets of documents, the only solution would be to provide a multiplicity of drawers, each drawer having a different subset of users.

With the system of the present invention, however, the security properties of an object are embodied in the list of "readers" and "writers" listed in the object itself. Thus, for a file underlying a particular object (whether the object describes the file itself, or whether the file is part of a collection described by an object), the security properties persist with the object. Even if a file is at different times placed in different collections, the security properties will remain with the file, because the file itself has an object with a list of readers and writers associated therewith.

According to a currently-preferred embodiment of the present invention, an object which describes a file, collection, or other object such as a calendar, has within its object data the "handles" of its owner, its readers, and its writers (there may further be a class of users called "managers," who have the same privileges as the owner but who are not the owner). The readers are those users who have only read access to the file or collection; the writers are those users having write access, and the owner is the user having the capability of altering the object itself and of deleting an underlying file or a portion thereof.

According to a currently-preferred embodiment of the invention, multiple users may be given "owner" rights to an object and its underlying files, and the "owner" rights include the ability to edit the permissions of what other users have read and/or write access to the object.

Further according to a currently-preferred embodiment of the invention, all of the users of the system in FIG. 1 who desire any type of access to secured files in file system 12 must at some point "create an account" with the command utility 18. As alluded to in the above table of attributes within an object, users themselves are assigned handles by the command utility 18 at the time of registration, as if the users were files in a collection. That is, regardless of the name or internet or e-mail address of a particular user, upon creation of an account for a user, the command utility 18 will associate the name or address of the user with a newly-generated handle, which once again is simply an identification number which persists with the user forever. In the owner, reader, and writer attributes within an object, the users are identified not by their names or addresses, but by their handles.

When a user account is created, a utility within command utility 18 called a "community registry" creates a new object which includes data describing the user. The registration process includes the user filling out an electronic form, data from which is used in the user object. Such user information can include, for example, the user's legal name, hard-copy and e-mail addresses, website URL, and the names of user groups he wishes to be associated with (this is equivalent of naming "parent" collections for the user, assuming the user groups have handles and objects associated therewith, and may be subject to security considerations). Also, preferably, at this point the new user will be asked to type in a password he will use for future logins to the system. The password will be checked by the command utility 18 at all future times the user logs into the system.

If a user does not want to register, i.e., create a user object with respect to the system, whenever he wants to login, the command utility will identify him as a "guest." A guest would not have to enter a password, but would have access only to those objects and underlying files with unrestricted read permissions, and of course would have no write or ownership access to any file. Typically, only a registered user, with a user object, would be able to create objects to object database 16 or add files to file system 12.

Prefatory to the activation of any of the above commands such as add, view, etc. the command utility 18 does a permission check on the user initiating the command. Thus, when a command is issued from a user, the command utility 18 checks the user's handle against the list of user handles in the owner, readers, and writers spaces, and then determines whether that particular command can be requested by that user. (Of course, for unsecured files and collections, a wild card variable or equivalent can be placed in the "readers" or even "writers" spaces in the object.)

The implementation of assigning handles to users as user objects are created, and then using the assigned handles to check permission to perform certain commands, is carried out in a variation of the known "cookie" system for identifying users in an Internet protocol. When a new object for the user is generated by command utility 18, the handle thereof is appended to the "cookie" used to identify the user on network 14. This "cookie" will then stay with the user for all future logins. Thus, when a particular object is desired by a particular user, command utility 18 first compares the handle within the cookie of the user with the list of user handles in the "read" field; only if the handle in the cookie matches one in the read field will the user be granted access.

It is implied by the overall structure of permissions, as they relate to files and collections of files, that an inheritability principle is facilitated. That is, because each individual file has a security associated therewith, in the form of the reader and writer permission in its object, even if the particular file is made part of a collection, the security properties will remain with the file even if the larger collection may have a broader range of permissions (i.e., more people are allowed to access the collection as a whole). It is possible, according to one embodiment of the present invention, to provide a software mechanism in which, if desired, the permissions associated with a collection are never broader than the permissions of any file within the collection. This can be carried out, for example, by a program within command utility 18, which reconciles permissions associated with a collection with the files within that collection. This reconciliation can be carried out by automatically altering the object associated with files in file system 12, and the files themselves never have to be invoked to reconcile permissions.

Figure 2:
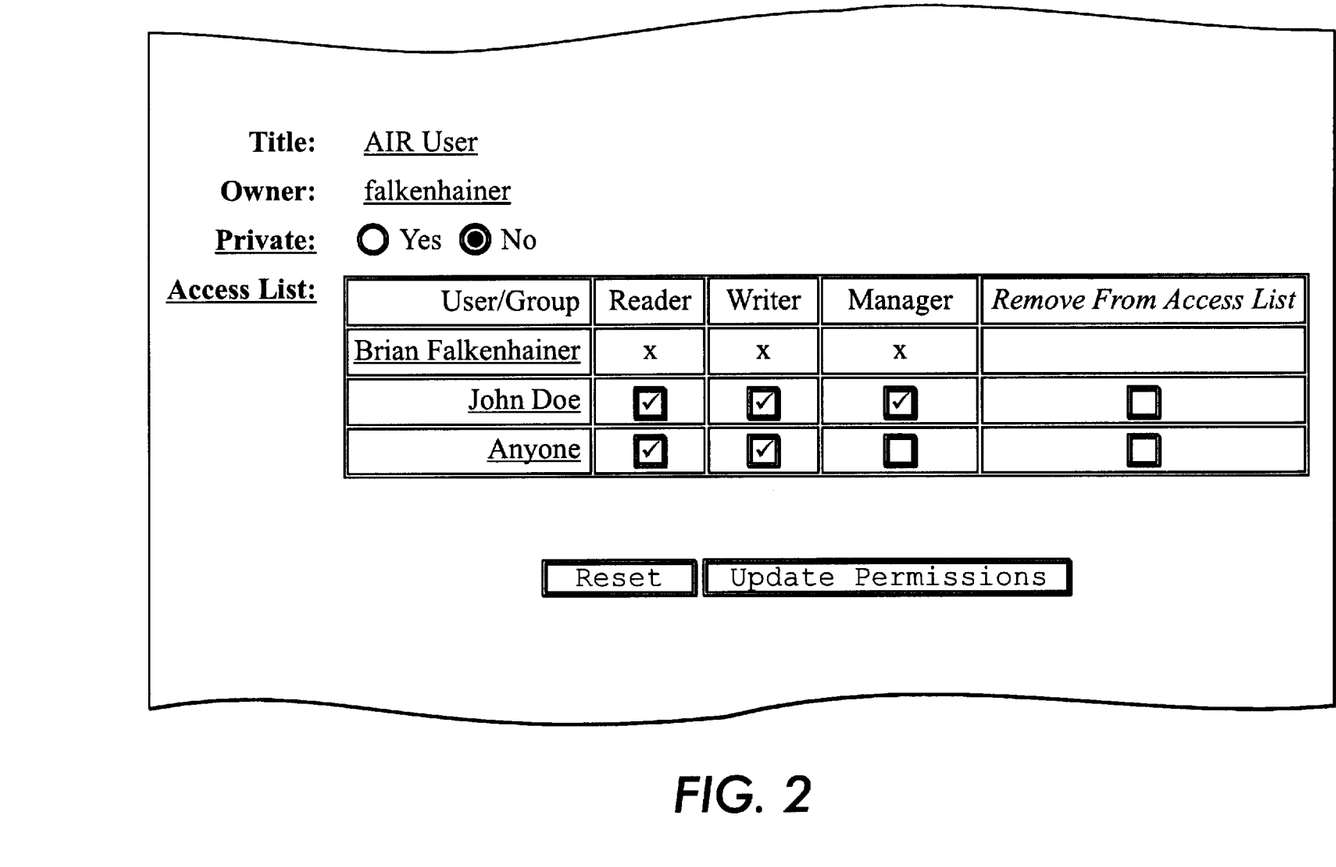
FIG. 2 is an example window through which a user may enter permissions to an object he has created.

FIG. 2 is an example of a screen which can be presented to a user (typically, the owner or manager of an object) when it is desired to edit the permissions of the object. A matrix is displayed, with a list of potential users and/or persons currently with at least read access (starting with the object owner) in the first column and the different types of permissions (including an option of removing a previously-listed person from the access list) extending across the columns. The owner or other manager can edit the permissions by clicking suitable boxes within the matrix.

Creation of Documents with Dynamic Content

Figure 3:
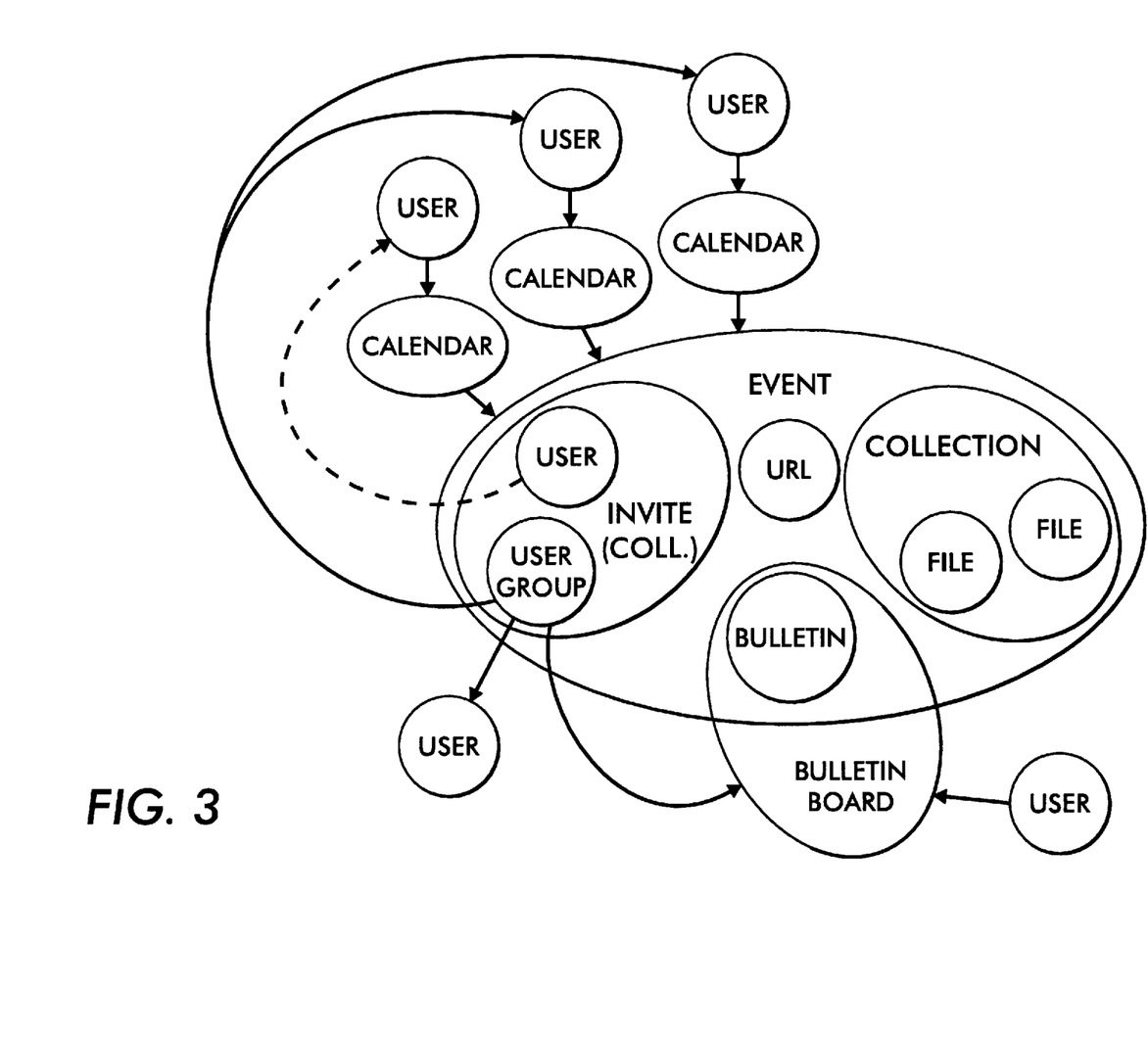
FIG. 3 is a diagram illustrating an example relationship among data objects within the environment of the present invention.

FIG. 3 is a diagram showing the interrelationship among objects, as the objects would exist within an object database 20, for an example of an event in which a number of users would attend, and in which there may be a collection of files for pre-reading. Starting from the top of the Figure, it can be seen that three users, each having his own calendar, would each have the "event" listed on the appropriate day for his particular calendar. An object describing the event exists only in one place in the object database 20, but the calendars of each user at the top of the Figure all include, in their calendar objects, a handle to this event. Further, each object describing a calendar includes a handle pointing to an object describing the user or owner of that calendar.

Within the handle describing the event, there may be several different types of objects to which the event object points. For example, if there are some files of pre-reading for the event, the event object can describe a collection object, as shown in the Figure, which in turn includes handles pointing to the files for pre-reading, as shown. The event object further includes a handle pointing to those users who are to be invited to the event. The handles for these users may be in the form of an object containing handles for a group of users, e.g., a user group object called "engineers in program Z" would be a collection object including the handles for all of the persons in that class. An unlimited number of ad-hoc user groups may be created by any user, within bounds of the permissions in the user objects. Creating a user group is simply a matter of creating a "collection" object with a handle-list of the users intended to be in the group. Of course, the "event" collection object could also include handles to users not in a group as shown, and a user group may include handles to users without customary access to the event object, as shown in the Figure.

Another possible object that may be collected in the "event" object is a bulletin object, which, as shown in the Figure, can be part of a bulletin board having other bulletins besides that describing the event. Typically, a bulletin board is intended to have wide access permissions, and a user with no other access to the event may be able to see the bulletin describing the event.

Another object that could appear in an "event" collection object is the URL of, for example, the homepage of a sponsoring organization, as shown. Also, the event collection may include provision for storing text in the object thereof, and this text can include hot-links to external websites.

A significant feature of the present invention, relating to the fact that the underlying files which are described by object are not stored hierarchically, relates to the ability for one type of object to be simultaneously "inside" and "outside" another object. For example, with the event shown in FIG. 3, whereas the event is "within" the calendar of the number of users, the user group collection object that describes users to be invited to the event is within the event object. As shown by the dotted line in the Figure, a user having the event on his calendar, but who is also listed as someone to be invited to the event, is described by an object which is a "child" of the event, but is also the owner of a calendar object which is a "parent" of the event. The point is that the hierarchy of whether a file is within a collection is always ad-hoc, depending on the perspective of a particular file being viewed by a particular user, and most importantly can be created independently of the files underlying the objects which are stored in file server 12. In the present example, regardless of whether users are added or taken off of a list of persons to be invited to the event (and that who have their handle collected in the event object), these changes affect only the objects in the object database 20, and have absolutely no affect on the underlying files in file system 12. Similarly, for the pre-reading of files in the collection, even if they are constantly being updated, because the files themselves exist only in one place, the updating occurs only to the files in one place in the file system, and the updates have no effect on the object database. The overall effect is that the present invention facilitates very low overhead of having to update a large number of files even as a list of invitees are constantly changed or the contents of the pre-reading files are constantly changed.

Another context in which the system of the present invention finds great utility is the context of a university having access to digitized course material, which could be stored as a series of articles, each with a separate file, in file system 12. If Professor A preparing a course would like to create a collection of articles XYZ, while Professor B would like to create a course packet of articles WXZ, each of the files WXYZ need only exist in one place in file system 12. Professor A and Professor B can then each create a collection, referencing the objects of the Article he desires, for access and/or printout. The practical advantage of maintaining each article WXYZ in one location in the file server is that for royalty-paying purposes, the number of total requests for printing out any particular article WXYZ can be easily maintained regardless of who requests an article. Further, if for example article Z is updated on a monthly basis, the updates need address only one location in the file system 12 and then would serve both professors.

Practical embodiment

The "heart" of the system of the present invention is command utility 18. The overall function of command utility 18 is to implement the basic commands, such as get, view, add, etc., described above, which are operative on objects in database 20. In one practical embodiment of the present invention, these commands exist in command utility 18 as sets of instructions in the "Python" scripting language, which are automatically invoked through the Common Gateway Interface (CGI) defined in the HTTP 1.0 standard. Use of any programming language through the CGI, or any web server specific interface, enable the commands to be embedded in a web server such as http server 16.

Another important utility generally associated with command utility 18 is what is known as a "session manager," which is a short program which issues identification numbers as handles are needed when objects are created. Various ways of issuing new handles for various types of objects, such as counting upward for each type of object, or generating random numbers, will be apparent.

Another kind of instruction generally associated with command utility 18 is known as an "object database routine." These routines act as a bridge between the simple strings of variables which are the objects as they are actually stored, and a "window" by which an object and the properties therein can be viewed on the screen of a user, such as for editing.

Another utility associated with command utility 18 is a "document manager." The general function of the document manager is to maintain control over multiple versions of the "same" file or document kept in file system 12. The document manager issues version numbers which are appended to new files which are declared by a user to be a new version of a previous file. The document manager issues to the new version a handle identical to a previous version, and a version number following thereon.

Finally, the present invention can readily be used in conjunction with a search engine which is operative on the files in file system 12, and/or on the variables within objects in database 20. The present invention enhances the usefulness of a search engine, in that, if a search engine is used to locate certain important files in file system 12, the objects associated with those files can be used to find related files via the "parents" of the located files. Further, the objects of the located files can be used to find other files which were written or modified by the same author, or find events which occurred or files which were created on the same day. Thus, the present invention can help a person researching an issue by overcoming the limitations of text-searching.

Persistent handles to avoid stale web links

With particular attention to http (or internet) server 16, a significant attribute of a practical embodiment of the present invention is that the shared-data environment exists "on the web," that is, is accessible through an internet protocol. However, as can be seen in the relationship between http server 16 and command utility 18, the "border" of the shared-data environment is marked by a conversion from internet-style URLs to the handles which are exclusive to the shared-data environment. In other words, a key function of command utility 18 is to convert URLs which are generally understandable on the internet to handles which are permanently associated with files in file system 12. This conversion of URLs into handles marks a key practical advantage of the present invention, namely the avoidance of "stale links" which are common, for example, in the maintenance of internet websites.

A typical URL, which identifies a particular page accessible through the internet, specifies a hierarchical order through which a user must "click through" in order to access the particular page. For example, a URL of a page describing a price list as of January 1995 for the Xerox Corporation may have the URL: www.xerox.com/pr/news/1995/january/prices/index.html. It will be noted that the URL itself (which, on the web, becomes the name of the file) specifies a hierarchy of files within files in order for a user to reach the desired price list. The practical problem occurs when the website is altered or reorganized, and the necessary sequence of "clicks" to reach a particular page no longer exists; it will then become much harder, or more nonintuitive, for a user to access a particular desired page. This is generally referred to here as a "stale link."

The system of the present invention can overcome the "stale link" problem with respect to files which have been stored in file system 12. For example, if the Xerox website, containing therein the above-mentioned price list, is reorganized by the Xerox systems administrator or webmaster, the same price list previously reached through the above URL could be reorganized to be at a different location. If, for example, the webmaster reorganizes the Xerox website by product and not by date, the new URL of the original January 1995 price list may turn into something like www.xerox.com/products/prices/index.html. Typical internet browsing software provides a system of "bookmarks" by which commonly-used or accessed files have there URLs retained for quick reference; the problem occurs when the URL, that is the location-based address, of a particular desired page is changed. Once the URL of a file is changed, the original URL is now instantly useless; and further, it may not always be possible for a user using an internet browser to find the desired page in the reorganized website.

Referring again to FIG. 1, command utility 18 not only assigns handles (that is, identification numbers to files which could include web links) placed in file system 12, but also in effect "renames" the original URL of a file, replacing the original, location-based, "hierarchical" URL with a new URL which is non-location-based and non-hierarchical, or in other words location-independent. For example, the original URL mentioned above, upon being filed in file system 12, will be effectively renamed http://www.xerox.com/get/file-0039, where "file-0039" in this example is just an arbitrary handle number. In this new URL, it will be noticed that the first part is simply the name of the world wide web server; the second part is a command, such as described in detail above; and the last part is the handle of the file placed in file system 12. It is this new URL which is placed, for example, (in the bookmark file or equivalent system, such as a web link) within the browser or other memory of a user 10 on network 14. Thus, the next time a user 10 wants to access that particular file, his browser will reference the file by the new, non-hierarchical URL, and not the original URL, which may eventually be made obsolete or "stale" by a reorganization of the web page. In brief, users accessing files in file system 12 refer to files not by a location-based, hierarchical URL which can be made obsolete or stale, but rather by a location-independent URL, incorporating only the handle of the file desired. This handle-based URL, because it is not location-based and does not refer to higher-level folders which may disappear, will thus survive any subsequent reorganization of the original source of the data file.

Of course, if a user chooses to retain an original hierarchy of internet folders, and retain one or more of the folders within file system 12, the higher-level folders, (in the above case, such as "pr," "news," "1995," "January") can be retained as collections within file system 12, with each subsequent folder in the hierarchy being a child of the previous. What is important is that the system of the present invention provides the essential step of renaming hierarchical, location-based URLs with non-hierarchical, location-independent URLs, which include only the handle of the file or collection. This feature enables the system of the present invention to overcome the "stale link" problem.

Because command utility 18 converts URLs to handles which are permanently associated with each file, a change in the hierarchy of "clicks" by which a user accesses a page and a website will still be accessible. With a typical URL, as noted above, the name of a file is indistinguishable from the path through the hierarchy through which it is reached; with the handle system of the present invention, a file can exist independent of any hierarchy; indeed, as noted above, each individual user can create his own hierarchy, or a file can exist without any hierarchy at all.

Community maintenance

Another key feature of the present invention is the fact that it can be "community maintained." In practical terms, the essence of being "community maintained" is that no super-user, such as a system administrator, webmaster, or other person with more than usual user privileges, is required to "oversee" the entire system. Typically, such as with a website, a certain person or persons designated as "webmaster" will have special privileges as to letting certain other users access all or portions of the website. With the present invention, because each individual file defines its own access permissions, security is carried out on a file-by-file basis, and no such super-user is needed.

When a person with no previous contact with the shared-data environment of the present invention first accesses http server 16 through the internet, command utility 18 identifies the user as being non-registered. If the user elects not to register with the system, the command utility 18 will identify this strange user as merely a "guest". As mentioned above, in order to have any access to restricted files within file system 12, a guest must create an account with the command utility 18. From the standpoint of "community maintenance," the important fact here is that a guest entering the system creates an account on his own motion and does not have to receive specific permission (for entering the system as a whole) from any kind of human super-user such as a webmaster or system administrator. The present invention provides an automatic mechanism by which a user with no previous contact with the system can merely request a user status, such as by creating an account, and this account creation is automatically generated by the system. With the present invention, each individual file acts as its own system administrator and controls what persons have access to it. This provision of security at the level of individual files, and not at the level of the entire system, is another important aspect of the "community maintenance" property of the system of the present invention.

System Summary

The above-described system includes many features which, although possibly available individually in other shared-data systems, act together within the system of the present invention to yield an unusually flexible service to its users. Of the many features of the invention, the three most significant are: 1) the conversion of network URLs to location-independent handles; 2) the provision of unique access rights for each object in the database, and therefore to each file in the file system; and 3) the concept of "community maintenance," in which no single super-user is required to grant permission to a user who wants access to any particular part of the system.

These three features of the present invention synergize. The fact that each file in the system retains its own individual access rights means that each individual file protects itself and therefore no super-user is required to act as a gatekeeper to the entire system. The provision of unique access rights attached to each file therefore facilitates the "community maintenance" feature of having users register themselves without causing a major security breach. Further, the concept that network, location-based URLs are converted to non-location-based URLs for files in the file system, enables individual users to create their own hierarchies for files in the filing system. Thus, if the original author of a file (whether within file system 12 or elsewhere) sets up a hierarchy of folders or files, once these files are placed in file system 12, the non-location-based handle associated with each file "frees" the file so that other users can place the file in hierarchies of their own devising. The location-independent URL aspect of the present invention synergizes with the property of unique access rights for each file to create a system whereby every user can organize whatever data he can access to his own taste. In this way, the three essential attributes of the system of the present invention work together to create a system in which each user can tailor a large quantity of information as the user requires.

While the invention has been described with reference to the structure disclosed, it is not confined to the details set forth, but is intended to cover such modifications or changes as may come within the scope of the following claims.

We claim:

1. A method of managing a plurality of files stored in an electronic file system, comprising the steps of:

assigning to each file in the file system a unique identification number;

assigning to a user with access to any file in the file system a unique identification number;

providing an object database, the object database including therein an object associated with each file in the file system, the object including the identification number of the file and an identification number of a user having access to the file;

providing a software mechanism whereby each identification number assigned to a file is associated with a location-independent URL;

converting a location-based URL of a file to a location-independent URL including an identification number usable by the software mechanism; and when a user enters a URL of a desired file, determining the identification number of the desired file, determining the identification number of the user, and consulting the object associated with the desired file to determine if the user has access to the file.

2. The method of claim 1, each user having associated therewith a memory for retaining URLs, and further comprising the step of causing a user to retain in memory a location-independent URL for a file desired by the user.

3. The method of claim 1, an object in the object database including identification numbers of a plurality of files.

4. The method of claim 1, further comprising the step of providing a software mechanism whereby a user can create an object having an identification number of a file in the file system.

5. The method of claim 4, further comprising the step of providing a software mechanism whereby any user having an identification number assigned thereto can create an object having an identification number of a file in the file system.

6. The method of claim 1, further comprising the step of providing a software mechanism whereby a user can request an identification number be assigned to him.

7. The method of claim 6, further comprising the step of, when a user requests an identification number, generating the identification number and appending the identification number to a network address of the user.

* * * * *